United States Patent
Bumgarner et al.

(10) Patent No.: US 10,968,070 B2
(45) Date of Patent: Apr. 6, 2021

(54) APPARATUS AND METHOD FOR TENSIONING AND THREADING OPTICAL FIBER

(71) Applicant: Corning Incorporated, Corning, NY (US)

(72) Inventors: Kirk Patton Bumgarner, Hampstead, NC (US); Bret Cooper Faler, Wilmington, NC (US); Jason Thomas Fralin, Wilmington, NC (US); Kelvin Nguyen, Wilmington, NC (US); Ashley Danielle Perritt, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 11 days.

(21) Appl. No.: 16/211,808

(22) Filed: Dec. 6, 2018

(65) Prior Publication Data
US 2019/0193982 A1    Jun. 27, 2019

Related U.S. Application Data

(60) Provisional application No. 62/610,722, filed on Dec. 27, 2017, provisional application No. 62/639,616, filed on Mar. 7, 2018.

(51) Int. Cl.
*B65H 51/10* (2006.01)
*B65H 57/12* (2006.01)
(Continued)

(52) U.S. Cl.
CPC .......... *B65H 51/105* (2013.01); *B65H 57/12* (2013.01); *B65H 59/22* (2013.01); *G02B 6/44* (2013.01);
(Continued)

(58) Field of Classification Search
CPC ...... B65H 51/105; B65H 59/18; B65H 59/22; B65H 57/12; B65H 2701/32; G02B 6/4464; G02B 6/502; G02B 6/52; H02G 1/086
See application file for complete search history.

(56) References Cited

U.S. PATENT DOCUMENTS

| 5,472,128 A | 12/1995 | Nagayama et al. |
| 6,434,314 B1 | 8/2002 | Gatica et al. |
| (Continued) | | |

FOREIGN PATENT DOCUMENTS

| DE | 4205362 A1 | 8/1993 |
| JP | 62091441 A | 4/1987 |
| (Continued) | | |

OTHER PUBLICATIONS

International Search Report and Written Opinion PCT/US2018/065892 dated Apr. 5, 2019, 12 Pgs.
(Continued)

*Primary Examiner* — William E Dondero
(74) *Attorney, Agent, or Firm* — Smit Kapadia

(57) ABSTRACT

An apparatus for tensioning and threading an optical fiber includes a first roller, a second roller, a belt that wraps around the first and second rollers, and a third roller. The belt may be in direct physical contact with the first and second rollers. The third roller may be movable between an engaged and a disengaged configuration relative to the belt. Alternatively, the first roller, second roller, and belt may be movable between the engaged and the disengaged configuration relative to the third roller. Actuation from the disengaged to the engaged configuration captures an optical fiber between the third roller and the belt.

19 Claims, 7 Drawing Sheets

(51) Int. Cl.
*B65H 59/22* (2006.01)
*C03B 37/03* (2006.01)
*G02B 6/44* (2006.01)

(52) U.S. Cl.
CPC ........ *B65H 2701/32* (2013.01); *C03B 37/032* (2013.01); *G02B 6/4479* (2013.01)

(56) References Cited

U.S. PATENT DOCUMENTS

| | | | |
|---|---|---|---|
| 7,832,675 | B2 | 11/2010 | Bumgarner et al. |
| 2002/0060265 | A1 | 5/2002 | Watson et al. |

FOREIGN PATENT DOCUMENTS

| | | | |
|---|---|---|---|
| JP | 03153539 | A | 7/1991 |
| JP | 05-294663 | A | 11/1993 |
| JP | 2001233546 | A | 8/2001 |

OTHER PUBLICATIONS

EP19161272 Office Action dated Apr. 17, 2019, European Patent Office, 6 Pgs.
Morimitsu et al; "Long-Distance Optical Fiber Cable Installation System Using Automatic Control Puller" ; Journal of Robotics and Mechatronics, vol. 10, No. 3 (1998) pp. 229-230.
European Patent Application No. 19161272.0, Summon to Attend Oral Proceedings dated Jan. 12, 2021; 9 pages; European Patent Office.

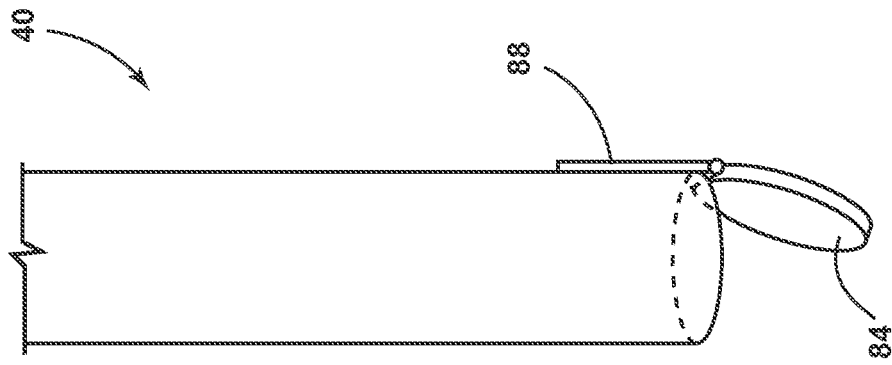
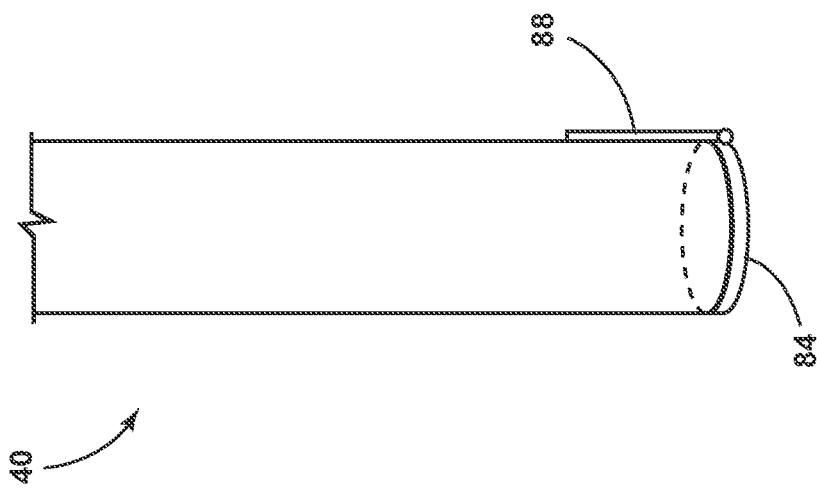

APPARATUS AND METHOD FOR TENSIONING AND THREADING OPTICAL FIBER

CROSS-REFERENCE TO RELATED APPLICATIONS

This application claims the benefit to Dutch Patent Application No. 2020822, filed on Apr. 25, 2018, which claims the benefit of priority under 35 U.S.C. § 119 of U.S. Provisional Application Nos. 62/639,616, filed Mar. 7, 2018, and 62/610,722, filed Dec. 27, 2017, the contents of each are incorporated herein by reference in their entirety.

FIELD OF THE DISCLOSURE

The present disclosure is generally directed to optical fibers. More specifically, the present disclosure is directed to an apparatus and method for tensioning and threading an optical fiber.

BACKGROUND OF THE DISCLOSURE

In the optical fiber manufacturing industries, long lengths of fiber are wound at high speeds upon machine-rotated, take-up spools for shipping and handling. As the fiber is wound on the spool, the fiber is laid down onto the spool in successive layers. In optical fiber manufacturing facilities, fiber winding typically occurs at the draw tower where the fiber is originally drawn.

Some fiber tensioning and threading systems use an aspirator to thread and rethread an optical fiber. The aspirator uses vacuum to acquire optical fiber that is travelling at some velocity from the draw tower (not shown). The aspirator tensions the fiber by applying high-pressure air to the fiber. The pattern of the high-pressure air causes the fiber to swirl, which presents a larger surface area for the high-pressure air to apply a force on the optical fiber and thereby generate tension. The high-velocity airstream, which may be provided by a hose connected to the aspirator, transports the fiber to a fiber collection can for disposal.

The aspirator is capable of acquiring and accumulating fiber at commonly used draw speeds. However, the aspirator may be unable to generate and maintain a constant tension on the fiber. The pattern of swirling that is induced in the fiber by the high-pressure air may cause the fiber to contact equipment in the path of the fiber during threading. Equipment that may be in the path of the fiber and subject to unintentional contact with the fiber as it swirls includes process pulleys on the winder and an inlet nozzle on the aspirator. Contact between the fiber and various pieces of equipment can cause the fiber to lose tension and break. Accordingly, the aspirator system has reached its maximum capacity at current draw speeds. Additionally, the high-pressure air required to tension the fiber is expensive and noisy.

SUMMARY OF THE DISCLOSURE

According to one embodiment, an apparatus for tensioning and threading an optical fiber includes a first roller, a second roller, a belt that wraps around the first and second rollers, and a third roller. The belt may be in direct physical contact with the first and second rollers. At least one of the first, second, and third rollers is actuatable such that the optical fiber is captured between the belt and the third roller. The first roller, the second roller, the third roller, and the belt are sized and positioned such that the optical fiber is moved through the apparatus for tensioning and threading an optical fiber at a speed of at least about 30 m/s.

According to a second embodiment, an apparatus for tensioning and threading an optical fiber includes a first roller, a second roller, a belt that wraps around the first and second rollers, and a third roller. The belt is in direct physical contact with the first and second rollers. The third roller is movable between an engaged and a disengaged configuration relative to the belt. The actuation of the third roller from the disengaged to the engaged configuration captures an optical fiber between the third roller and the belt. The apparatus for tensioning and threading an optical fiber further includes an entrance nozzle that has a guide structure. The guide structure is generally teardrop shaped. The guide structure aids in positioning the optical fiber relative to the first roller, the second roller, the third roller, and the belt to capture the optical fiber between the third roller and the belt by the actuation of the third roller to the engaged configuration.

According to a third embodiment, an apparatus for tensioning and threading an optical fiber includes a first coated roller that is coated with a first material that increases a coefficient of friction of a surface of the first coated roller, a second coated roller that is coated with a second material that increases a coefficient of friction of a surface of the second coated roller, and a pinch roller. The second coated roller is positioned upstream of the first coated roller. The pinch roller is positioned proximate the first coated roller. The pinch roller is operable between an engaged configuration and a disengaged configuration. Actuation of the pinch roller from the disengaged configuration to the engaged configuration is configured to capture an optical fiber between the pinch roller and the first coated roller.

The embodiments of the fiber tensioning and threading apparatus described herein may be located downstream of the fiber draw system, and advantageously enable long lengths of the drawn optical fiber to be wound at high speeds upon machine-rotated, take-up spools for shipping and handling. According to some embodiments the fiber is drawn, coated and then enters the fiber tensioning and threading apparatus at a high speed of at least 30 m/sec (e.g. 30-100 m/sec) to enable long lengths of the drawn optical fiber to be wound at high speeds upon machine-rotated, take-up spools for shipping and handling.

BRIEF DESCRIPTION OF THE DRAWINGS

FIG. 5A is a side perspective view of one embodiment of a venting assembly that may be employed on the apparatus, according to one embodiment, illustrating a valve in a closed position;

FIG. 5B is a side view of the venting assembly, illustrating the valve in an open position;

DETAILED DESCRIPTION

Figure 1:
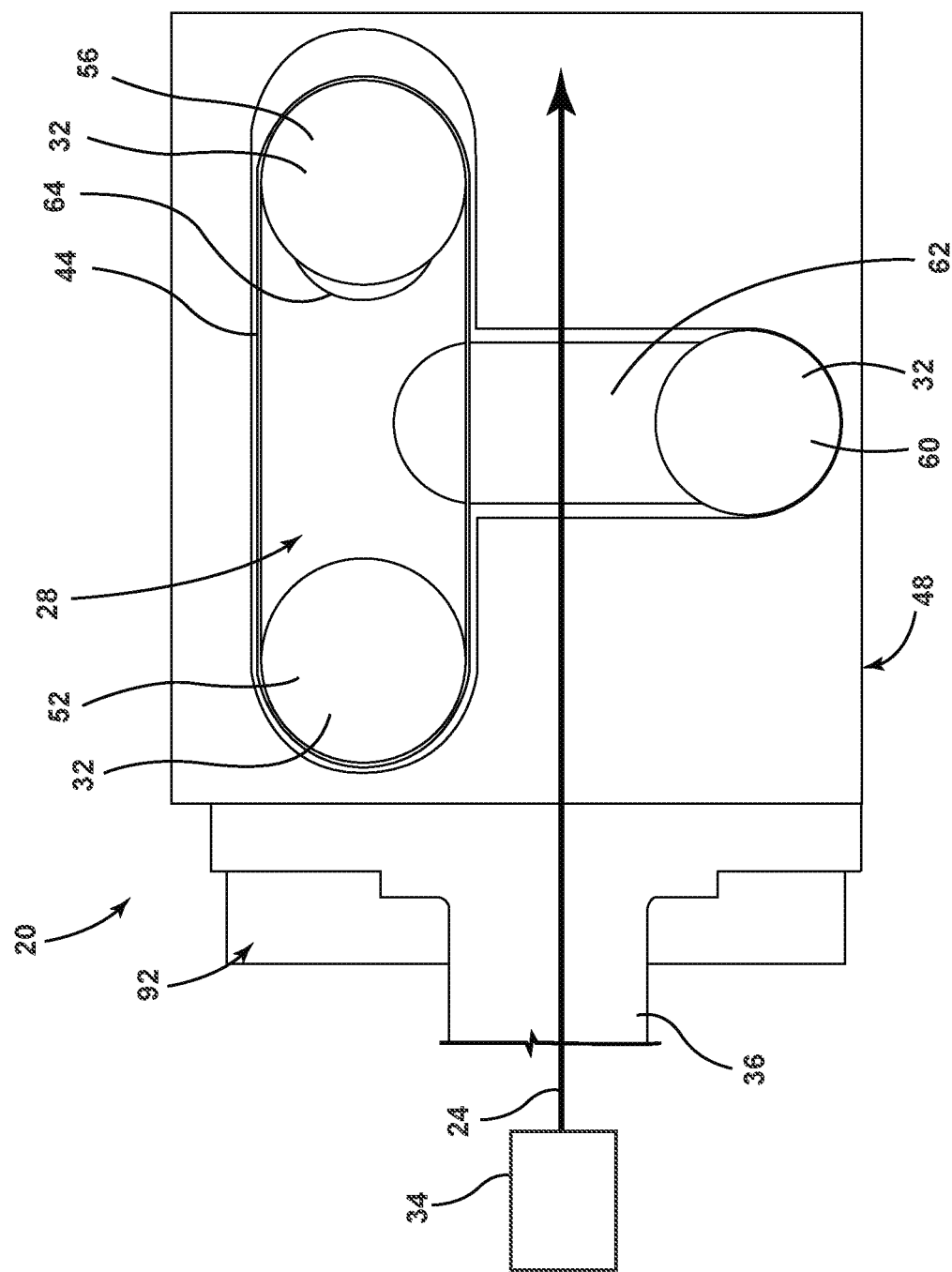
FIG. 1 is a side view of an apparatus for tensioning and threading an optical fiber, illustrating a roller assembly in a disengaged configuration, according to one embodiment.

Reference will now be made in detail to the present preferred embodiments of the invention, examples of which are illustrated in the accompanying drawings. Whenever possible, the same reference numbers will be used throughout the drawings to refer to the same or like parts. One or more examples of an apparatus for tensioning and threading an optical fiber is shown in FIGS. 1-7, and is designated generally throughout by reference numeral 20.

With reference to FIGS. 1-7, in various embodiments, the apparatus for tensioning and threading an optical fiber 20 of the present disclosure is configured to provide tension to an optical fiber 24. The tension provided to the optical fiber 24 is not intended to refer to the tension typically provided to the optical fiber 24 during a process of drawing the optical fiber 24 on a draw tower or a draw tower assembly. Rather, the tension provided to the optical fiber 24 in the present disclosure refers to tension that is provided after the optical fiber 24 has been fully formed (e.g., drawn, coated, etc.). The optical fiber 24 may be wound onto a fiber winding spool (not shown) at a relatively high rate of speed, e.g., draw speeds of greater than about 20 m/s, greater than about 30 m/s, greater than about 40 m/s, greater than about 50 m/s, greater than about 60 m/s, greater than about 70 m/s, greater than about 80 m/s, greater than about 90 m/s, or greater than about 100 m/s. In some exemplary embodiments, draw speeds may be about 20 m/s to about 30 m/s, or about 20 m/s to about 40 m/s, or about 20 m/s to about 50 m/s, or about 20 m/s to about 60 m/s, or about 20 m/s to about 70 m/s, or about 20 m/s to about 80 m/s, or about 20 m/s to about 90 m/s, or about 20 m/s to about 100 m/s, or about 20 m/s to about 110 m/s, or about 20 m/s to about 120 m/s, or about 20 m/s to about 130 m/s, or about 20 m/s to about 140 m/s, or about 20 m/s to about 150 m/s. The fiber 24 is also maintained under a relatively high tension to ensure successful threading onto the fiber winding spool. The fiber 24 may be supplied directly from any known type of drawing apparatus (not shown), a known type of optical fiber tensile, a screening device (not shown), or any other source.

Figure 2:
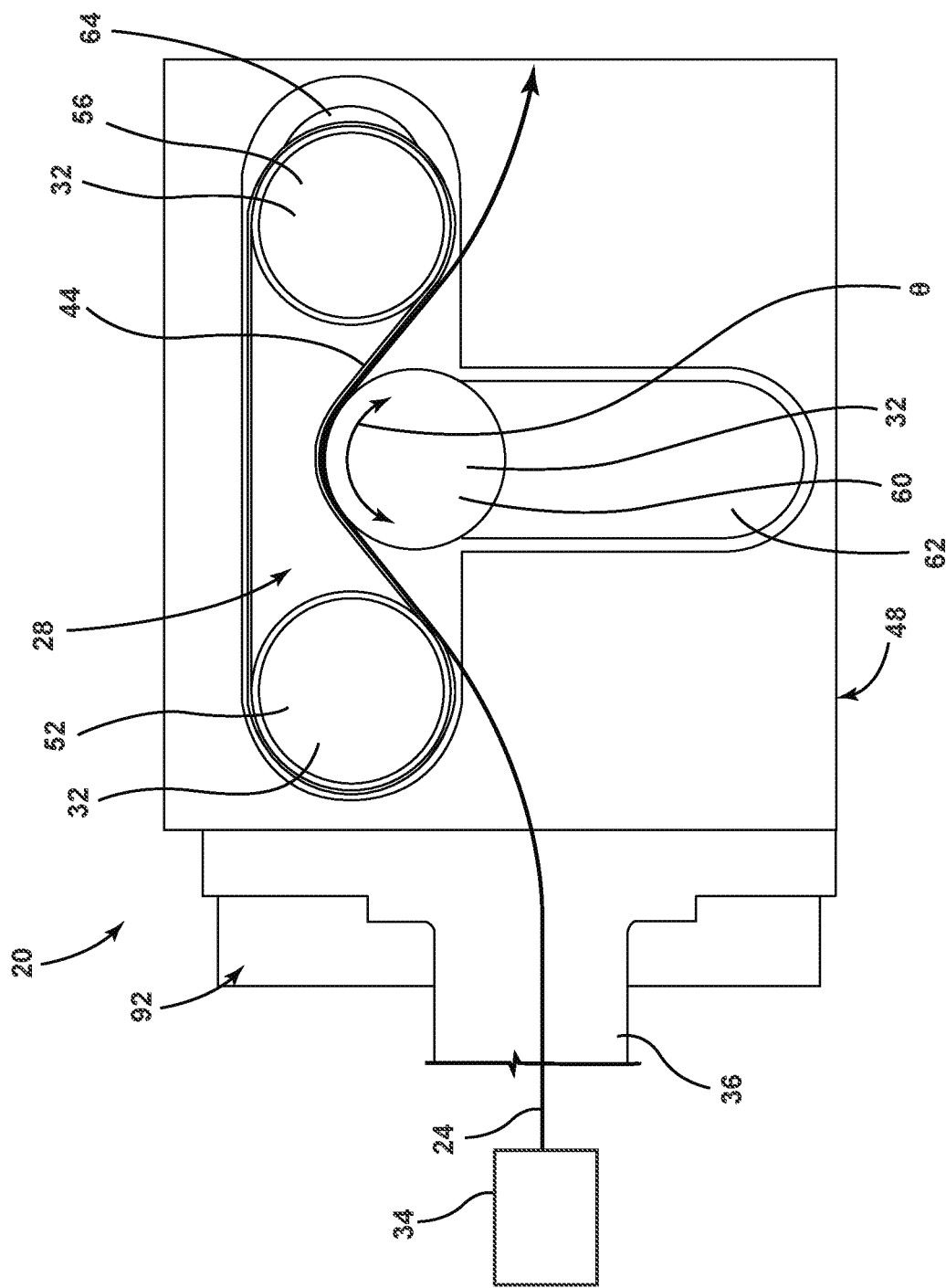
FIG. 2 is a side view of the apparatus for tensioning and threading an optical fiber, illustrating the roller assembly in an engaged configuration, according to one embodiment.

Referring particularly to FIGS. 1 and 2, the apparatus 20 of the present disclosure is a mechanical apparatus designed to transport a moving length of optical fiber 24 to a disposal can and/or a spool. The apparatus 20 may utilize vacuum to acquire the optical fiber 24 in a manner similar to an aspirator-type device. Unlike an aspirator-type device, in the apparatus disclosed herein high-pressure air is not utilized as a way of generating tension or transporting the fiber 24 to a collection can or spool. Said another way, the apparatus 20 of the present disclosure operates without employing high-pressure air. Instead, the apparatus 20 of the present disclosure tensions the optical fiber 24 by capturing the fiber 24 in a roller assembly 28. The roller assembly 28 includes a plurality of rollers 32. At least one of the rollers 32 may be coupled to a motor. The roller assembly 28 tensions the optical fiber 24 such that an increase in motor torque yields an increase in tension in the fiber 24. In various examples, the motor torque can be adjusted or varied to maintain or alter the tension provided to the optical fiber 24 by the apparatus 20. The apparatus 20 of the present disclosure may be utilized to provide tension to a section of the fiber 24 that is positioned between a draw tractor 34 of a fiber draw tower and the roller assembly 28. The draw tractor 34 is typically employed to provide tension to the fiber 24 as the fiber 24 is being drawn from the draw tower. The draw tractor 34 pulls the fiber 24 from a preform of the fiber 24 that is heated, for example, by a furnace. The apparatus 20 is downstream of the draw tractor 34.

In some examples, the apparatus 20 relies solely on vacuum or negative pressure as the method of transporting the fiber 24 to the collection can after exiting the roller assembly 28. FIG. 1 shows an example of the apparatus 20 of the present disclosure. The optical fiber 24 enters the apparatus 20 through an entrance nozzle 36, which is connected to a negative pressure such that a low pressure is generated at the entrance nozzle 36. Accordingly, the low pressure at the entrance nozzle 36 collects or acquires the fiber 24. The fiber 24 then enters the apparatus 20 and exits through an opposite end of the apparatus 20. In some examples, the apparatus 20 may be equipped with a venting assembly 40. The venting assembly 40 may take various forms, which include, but are not limited to, a variety of valve assemblies. Additionally, the venting assembly 40 may be positioned at various locations on the apparatus 20 so long as the venting assembly 40 is fluidly coupled (i.e. providing a path for transferring fluids (i.e., liquid and/or gas) between the components) to the apparatus 20. Finally, the fiber 24 passes through the venting assembly 40 to the collection can.

While some examples may rely solely on vacuum or negative pressure, it is contemplated that high-pressure air injection systems may be utilized in conjunction with one or more possible roller configurations of the roller assembly 28 disclosed herein (e.g., see Configuration 1 and Configuration 2, below) to generate additional tension inside the apparatus 20, if desired. When the roller assembly 28 is in a disengaged configuration as shown in FIG. 1, the fiber 24 may be transported to the disposal can or collection can by vacuum or negative pressure through the venting assembly 40. In some embodiments, it may be desirable to dispose of a portion of the fiber 24 prior to spooling. For example, when the fiber draw has just begun and the fiber 24 being pulled from the draw tower does not yet meet the desired specifications of a target fiber 24, then the portion of the fiber 24 that is outside of the desired specifications may be discarded. Once a winding spool has been filled with an amount of the fiber 24, then the engaged configuration of the roller assembly 28 may be utilized to transport the fiber 24 to the next spool for winding. An engaged configuration of the roller assembly 28 illustrated in FIG. 2 may be utilized to rapidly and efficiently transport the fiber 24 from the draw tower to the winding spool. Additionally, the engaged configuration of the roller assembly 28 may maintain tension on the optical fiber 24 as the fiber 24 leaves the draw tower.

Figure 7:
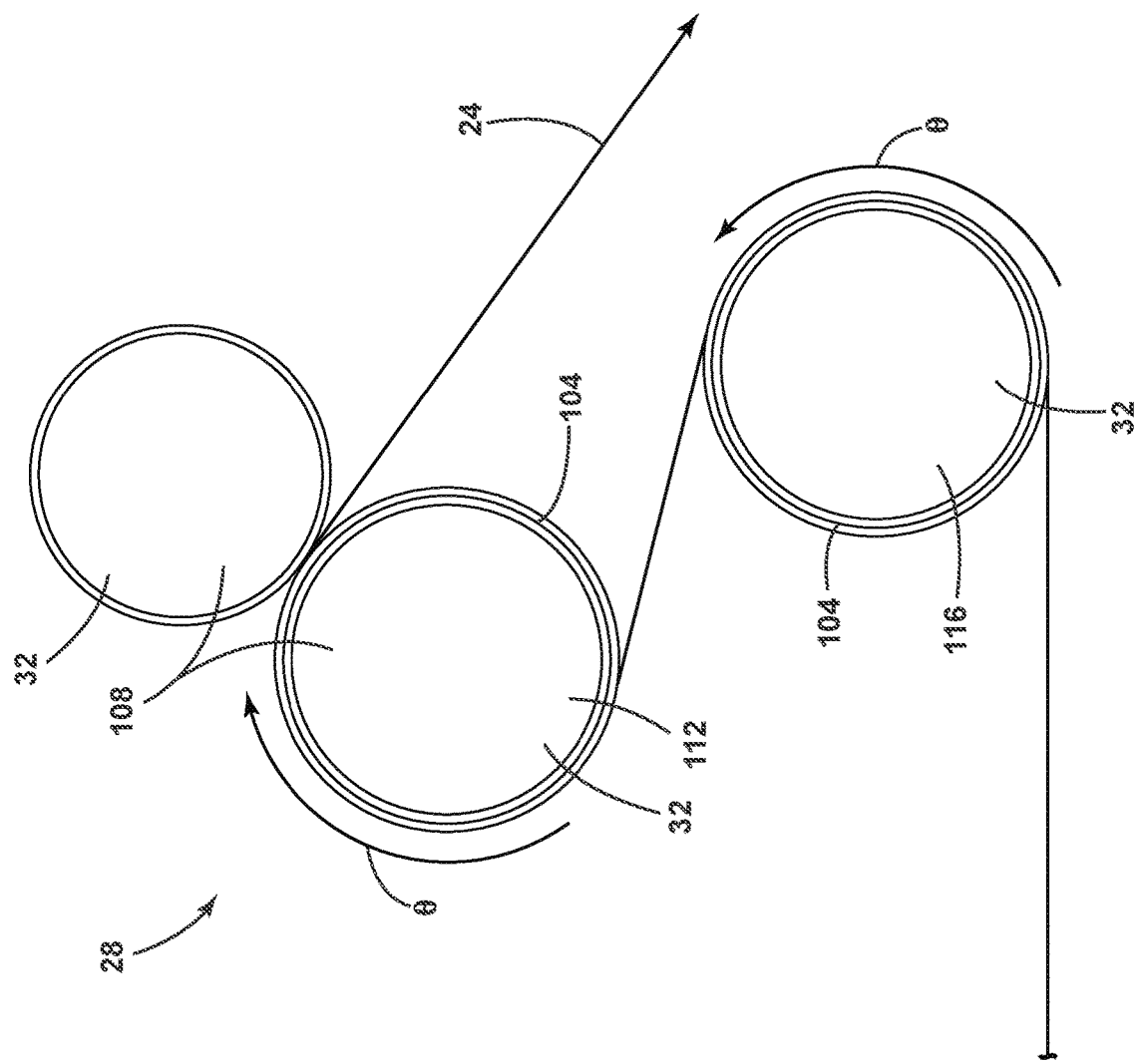
FIG. 7 is a side view of an alternative embodiment of the roller assembly.

The rollers 32 may be arranged in two primary configurations, the first configuration may be referred to as belted rollers shown in FIGS. 1 and 2, while the second configuration may be referred to as coated rollers or pinch rollers shown in FIG. 7. Each configuration will be described in further detail below. Additionally, each configuration may utilize vacuum or negative pressure for the initial collection or acquisition of a free end of the optical fiber 24, which is moving at some velocity, from a draw tower assembly. Further, both configurations utilize a collection can (not shown) and/or spool for the fiber 24. In various examples, the fiber 24 is transported from the apparatus 20 to the collection can and/or spool by vacuum or negative pressure.

Roller Configuration 1: Belted Rollers

Referring to FIGS. 1 and 2, Configuration 1 includes the plurality of rollers 32. In the depicted example, three rollers 32 are utilized where at least two of the rollers 32 are motor-driven and at least one belt 44 is driven by one of the rollers 32 that is motor-driven. While three rollers 32 are utilized in the depicted example, it is contemplated that more than three rollers 32 may be utilized without departing from the concepts disclosed herein. The roller assembly 28 can be enclosed in a compartment 48, as shown in FIG. 1. The compartment 48 may be sealed, for example with an air-tight seal. Regardless of the embodiment or example, the compartment 48 contains a system that is configured to isolate optical fiber 24 that is tensioned from optical fiber 24 that is not tensioned. The optical fiber 24 enters the compartment 48 through the entrance nozzle 36 and exits the compartment 48, for example, through the venting assembly 40, which may be coupled to the compartment 48 downstream of the roller assembly 28. The roller assembly 28 is capable of at least two configurations. The first configuration is a disengaged configuration (FIG. 1). In the disengaged configuration, the rollers 32 are positioned such that the fiber 24 freely moves in a space between the rollers 32 without physically contacting any of the rollers 32. The second configuration is an engaged configuration (FIG. 2). In the engaged configuration, the rollers 32 contact the fiber 24 and apply tension to a strand of optical fiber 24.

FIG. 2 shows an example of the engaged configuration, in which the belt 44 is directly coupled to a first roller 52 and a second roller 56. In the depicted example, one of the first and second rollers 52, 56 is motor-driven and the other of the first and second rollers 52, 56 is freely rotatable. The term freely rotatable, as used herein, is intended to convey that the motor-driven roller imparts rotation to the freely rotatable roller by way of the belt 44 and that the freely rotatable roller effects minimal drag or impediment to rotation. In some examples, the belt 44 may be made of a material that is capable of generating a large amount of friction against an exterior surface of the fiber 24. For example, the high-friction material that the belt 44 is made of may be neoprene. Additionally, the material that the belt 44 is made of may possess a high wear resistance and permit a wrap angle θ of at least about twenty-five degrees (25°), at least about fifty degrees (50°), at least about seventy-five degrees (75°), at least about one-hundred degrees (100°), at least about one-hundred-twenty-five degrees (125°), and/or combination or ranges thereof. A third roller 60, in this example, may be operable independent of whether the first and second rollers 52, 56 are activated or operable. In various examples, the third roller 60 may be motor-driven. The third roller 60 is independently operable between a first position that represents the disengaged configuration and a second position that represents the engaged configuration. The third roller 60 may travel in a third roller travel track 62. In various examples and configurations, the first, second, and third rollers 52, 56, 60 may have an outer diameter in the range of about 10 mm to about 80 mm. For example, the outer diameter of the first, second, and third rollers 52, 56, 60 may be about 10 mm, about 20 mm, about 30 mm, about 40 mm, about 50 mm, about 60 mm, about 65 mm, about 70 mm, about 80 mm, and/or combinations or ranges thereof. The first, second, and/or third rollers 52, 56, 60 may be operated at a roller rotation speed in the range of about 0 to 40,000 RPM during a ramp-up or warm-up period. For example, the first, second, and/or third rollers 52, 56, 60 may be operated at a roller rotation speed of about zero RPM, about 5,000 RPM, about 10,000 RPM, about 15,000 RPM, about 20,000 RPM, about 25,000 RPM, about 30,000 RPM, about 35,000 RPM, about 40,000 RPM, and/or combinations or ranges thereof during the ramp-up or warm-up period. The first, second, and/or third rollers 52, 56, 60 may be maintained at a rotation speed in the range of about 20,000 to about 60,000 RPM during a threading-onto-a-spool period. For example, the first, second, and/or third rollers 52, 56, 60 may be maintained at a rotation speed of about 20,000 RPM, about 30,000 RPM, about 40,0000 RPM, about 50,000 RPM, about 60,000 RPM, and/or combinations or ranges thereof during the threading-onto-a-spool period.

The transition between the engaged and disengaged configurations may be accomplished by an actuator, which moves the third roller 60 between the engaged and disengaged configurations. Alternatively, the actuator may move the first and second rollers 52, 56 that are coupled by the belt 44 between the engaged and disengaged configurations such that the third roller 60 is rotatable without being translatable or movable (i.e., the third roller 60 does not travel in the third roller travel track 62). FIG. 1 shows the disengaged configuration where the third roller 60 is positioned below a travel path of the fiber 24 and the first and second rollers 52, 56 are positioned above the travel path of the fiber 24. FIG. 2 shows the engaged configuration where the fiber 24 is directly engaged by both the third roller 60 and the belt 44. By so positioning the fiber 24 in the engaged configuration, a sufficient pinch force may be provided to generate tension on the portion of the optical fiber 24 that is upstream of the roller assembly 28. Said another way, the pinch force generates tension on the portion of the optical fiber 24 that is traveling to the apparatus 20 and entering the entrance nozzle 36. The tension provided to the optical fiber 24 prepares the fiber 24 to thread an optical fiber winder that may aid in disposing the fiber 24 onto the spool. As the fiber 24 leaves the second roller 56 while in the engaged configuration, the fiber 24 may be transported through the venting assembly 40 by vacuum or negative pressure to the collection can.

It may be beneficial to the operation of the apparatus 20 to provide accurate and precise control of the motor or motors that drive the roller assembly 28. One method of controlling the motor(s) includes stabilizing any motors at a velocity of about 1 m/s greater than a velocity of the optical fiber 24, about 3 m/s greater than a velocity of the optical fiber, about 5 m/s greater than a velocity of the optical fiber 24, about 7 m/s greater than a velocity of the optical fiber 24, about 9 m/s greater than a velocity of the optical fiber 24, and/or combinations or ranges thereof. After the first, second, and/or third rollers 52, 56, 60 have transitioned from the disengaged configuration (FIG. 1) to the engaged configuration (FIG. 2), and having successfully captured or acquired the fiber 24, the motor(s) may transition from maintaining a constant velocity (e.g., about 5 m/s greater than the velocity of the fiber 24) to a constant torque mode where the motor(s) supply a constant torque to the first, second, and/or third rollers 52, 56, 60. In the constant torque mode, the motor(s) can provide the tensioning of the optical fiber 24.

For a configuration similar to the one shown in FIG. 2, it is possible to achieve a tension of about 2.65 Newtons (N), 2.84 N, 3.04 N, 3.24 N, and/or combinations or ranges thereof on a section of the optical fiber 24 that is travelling "at speed." "At speed" as used herein is intended to refer to the speed of the optical fiber 24 as the optical fiber 24 is traveling or moved through the roller assembly 28. The optical fiber 24 may be moved through the roller assembly 28 at a speed in the range of about 20 m/s to about 120 m/s or greater. For example, the optical fiber 24 may be moved through the roller assembly 28 at a speed or velocity of about 20 m/s, about 30 m/s, about 40 m/s, about 50 m/s, about 60 m/s, about 70 m/s, about 80 m/s, about 90 m/s, about 100 m/s, about 110 m/s, about 120 m/s, and/or combinations or ranges thereof. Exemplary ranges may include at least about 20 m/s to less than about 120 m/s, at least about 20 m/s to less than about 100 m/s, at least about 20 m/s to less than about 80 m/s, at least about 20 m/s to less than about 60 m/s, at least about 20 m/s to less than about 40 m/s, at least about 40 m/s to less than about 120 m/s, at least about 60 m/s to less than about 120 m/s, at least about 80 m/s to less than about 120 m/s, at least about 100 m/s to less than about 120 m/s, and/or combinations thereof. A minimum tension of about 0.50 N may be desirable for the threading process where the fiber 24 is threaded onto a spool. However, providing a tension to the fiber 24 that exceeds 0.50 N may provide further stability to the fiber 24 and improve the success rate of the threading. For example, the tension provided to the fiber 24 may be about 0.50 N, about 1 N, about 3 N, about 5 N, about 7 N, about 9 N, about 11 N, about 13 N, about 15 N, and/or combinations or ranges thereof. The term "threading" as used herein refers to the process by which the optical fiber 24 is transferred from the apparatus 20 to a spool.

Figure 4:
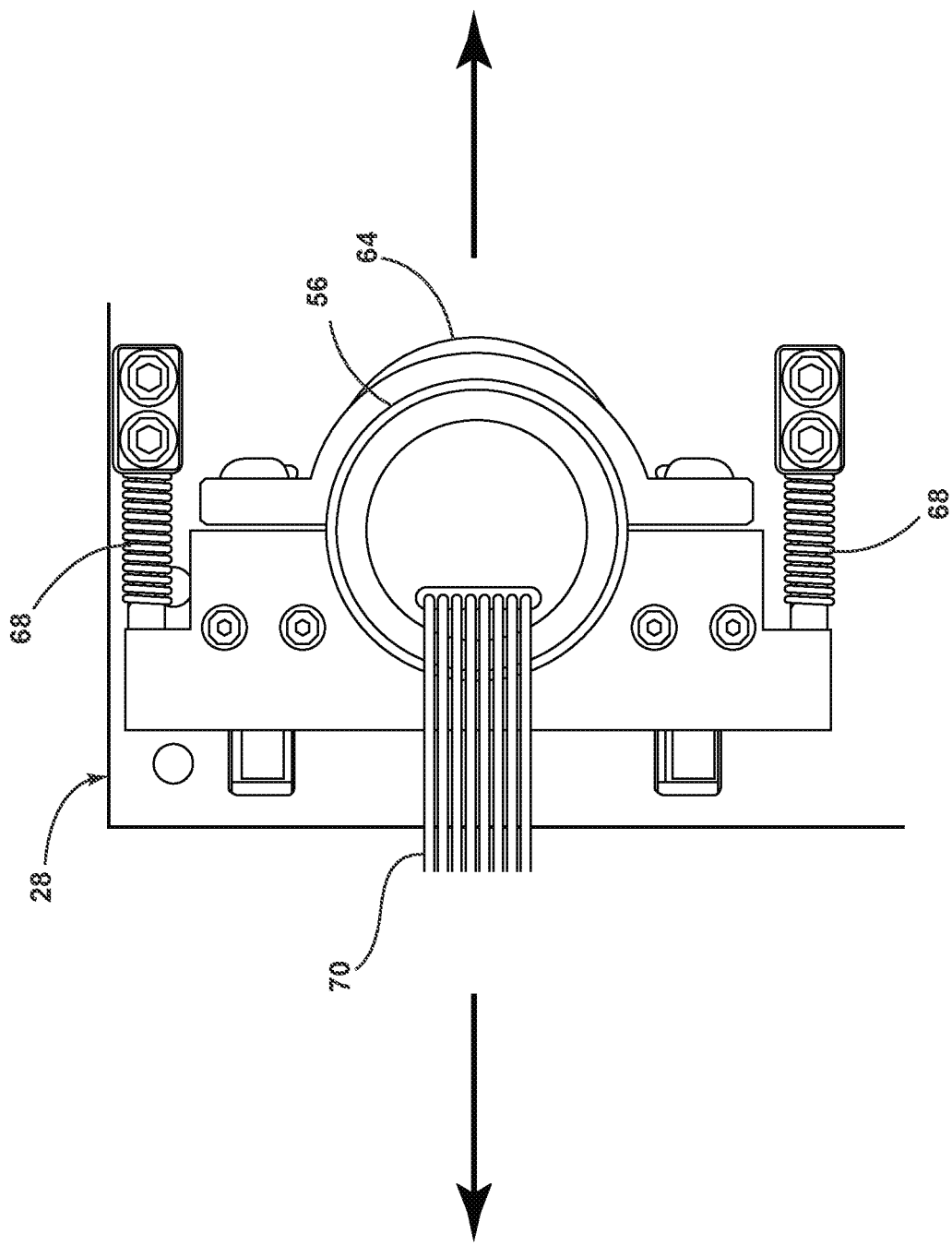
FIG. 4 is a rear view of a portion of the roller assembly, illustrating a plurality of biasing members and power lines that couple to a motor, according to one embodiment.

Referring to FIGS. 1, 2, and 4 the belt 44 may be maintained in a tensioned state by the second roller 56. The second roller 56 may provide a constant and configurable force to the belt 44 to affect the tensioned state. For example, the second roller 56 may be biased or forced to an extended position along a second roller travel track 64 by one or more biasing members 68 (FIG. 4). The biasing member 68 may be a spring, an air cylinder, a gas piston, or the like. In the example depicted in FIG. 4, the second roller 56 may be driven such that a torque is provided to the second roller 56. For example, the second roller 56 may be driven by an electronically commutated (EC) motor with torque control. Alternatively, the second roller 56 may be driven by an air motor, a constant speed motor that includes a clutch that can control the torque provided, or any other suitable approach to imparting driven motion to the second roller 56. In some examples, the first roller 52 may be freely rotatable. In such an example, power may be supplied to a backside of the second roller 56, where the motor may be located or coupled, by one or more power lines 70. In various examples, the biasing members 68 maintain a constant force on the second roller 56 of the roller assembly 28 independent of whether the roller assembly 28 is in the engaged or the disengaged configuration. The biasing members 68 provide the biasing force that biases the second roller 56 to an extended position within the second roller travel track 64 (e.g., when the roller assembly 28 is in the disengaged configuration). When the third roller 60 actuates such that the roller assembly 28 assumes the engaged configuration, then the interaction induced in the belt 44 by the third roller 60 compresses the biasing members 68 such that the second roller 56 is actuated to a retracted position within the second roller travel track 64. In embodiments where the third roller 60 does not travel in the third roller travel track 62, the biasing members 68 may be configured in a similar manner to that described above. The large arrows depicted in FIG. 4 indicate the direction of travel of the second roller 56 in the second roller travel track 64. Ultimately, the biasing members 68 provide tension to the belt 44.

Figure 6B:
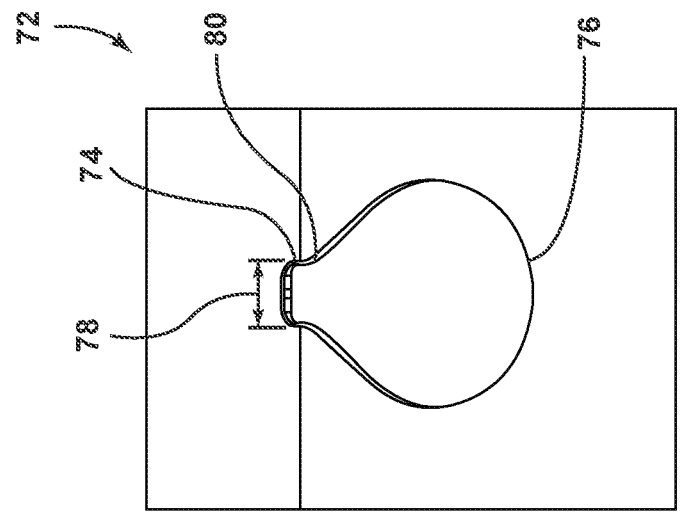
FIG. 6B is a front view of the guide structure, according to one embodiment.
Figure 6A:
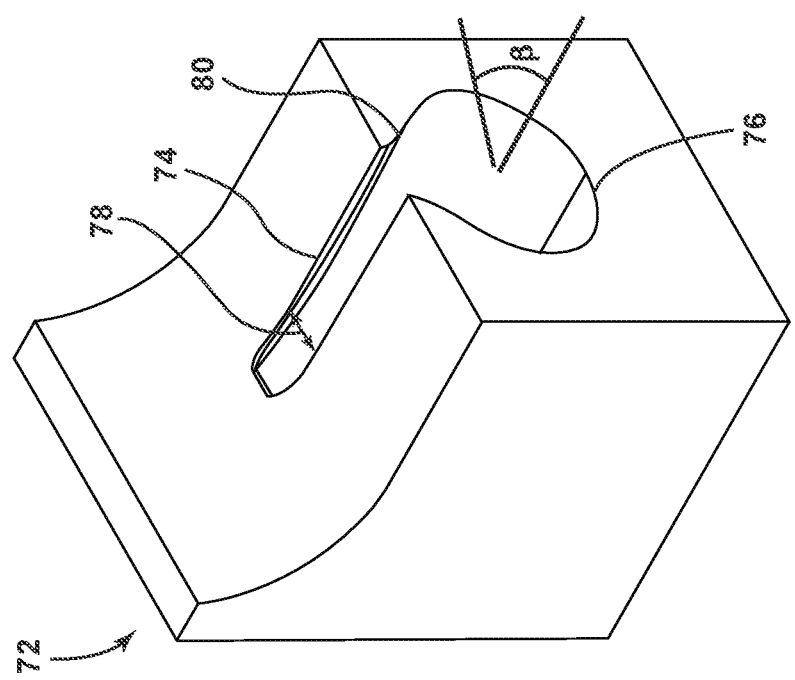
FIG. 6A is a side perspective view of a guide structure, according to one embodiment.

To ensure the fiber 24 achieves a correct position in the apparatus 20 and remains sandwiched between the belt 44 and the third roller 60 when in the engaged configuration, a guide structure 72 may be positioned at an opening of the entrance nozzle 36. An example profile for the guide structure 72 is shown in FIGS. 6A and 6B. As the third roller 60 is transitioned between the engaged and disengaged configurations, the fiber 24 is forced to follow the shape or contours of the guide structure 72. In the example depicted in FIGS. 6A and 6B, the guide structure 72 is larger at a base 76 and narrows as an upper portion 80 of the guide structure 72 is approached such that the guide structure 72 has a generally tear-drop shape. The upper portion 80 of the guide structure 72 is nearer than the base 76 to the belt 44. Said another way, the upper portion 80 is vertically above the base 76 and the belt 44 is vertically above the guide structure 72.

In some embodiments, the guide structure 72 is not wider than the belt 44 at the narrowest point of the guide structure 72. The upper portion 80 of the guide structure 72 may include a guide channel 74 that has a width 78 that is in the range of greater than the outer diameter of the optical fiber 24 to less than a width of the belt 44. When the apparatus 20 is in the engaged configuration, if an entrance angle β that the fiber 24 enters the entrance nozzle 36 at changes, then the guide structure 72 ensures that the fiber 24 remains sandwiched between the belt 44 and the third roller 60. Said another way, the guide structure 72 prevents the optical fiber 24 from becoming disengaged from the belt 44 and/or the third roller 60 when the roller assembly 28 is in the engaged configuration (FIG. 2). The geometry of the guide structure 72 may additionally be utilized to decrease air flow and particularly decrease air flow fluctuations that can disrupt the behavior of the belt 44 and/or the fiber 24. Additionally, the guide structure 72 limits the movement of the fiber 24 in directions orthogonal to the direction that the fiber 24 is being tensioned such that the fiber 24 may remain generally or substantially centered on a width of the belt 44.

In an alternate configuration, the compartment 48 surrounding the first, second, and third rollers 52, 56, 60 may be removed to leave the first, second, and third rollers 52, 56, 60 unrestricted and unsusceptible to the effect of vacuum or negative pressure. An advantage to this alternative configuration is reducing the effect of the vacuum or negative pressure on the belt 44 and the first, second, and third rollers 52, 56, 60. The vacuum or negative pressure may adversely affect the belt 44 by causing deformation to the belt 44. The vacuum or negative pressure may cause the first, second, and/or third rollers 52, 56, 60 to be more prone to stalling. While some advantages may be presented with respect to removing the presence of vacuum or negative pressure from the region where the belt 44 and rollers 52, 56, 60 are located, by utilizing the present alternate configuration, complications for acquiring and centering the fiber 24 through the roller assembly 28 may be introduced.

In another alternative configuration, the apparatus 20 may be equipped with a venting mechanism, such as the venting assembly 40 illustrated in FIGS. 5A and 5B. The venting assembly 40 may be located at the exit of the compartment 48. The venting assembly 40 may be utilized to reduce the impact of the vacuum or negative pressure on the belt 44 and rollers 52, 56, 60. FIGS. 5A and 5B represent an example of the venting assembly 40. The venting assembly 40 includes a valve 84 that may be operated between an open and a closed position. The valve 84 may be actuated between the open and closed positions, for example, by an actuator 88. The actuator 88 may be a rotational actuator, a screw-drive actuator, or a linear actuator. When the actuator 88 is in a retracted position, the valve 84 is placed in either the opened or the closed position. Upon extending the actuator 88 to an extended position, the valve 84 is actuated to the other of the open or closed position. When the valve 84 is in the open position, the magnitude of the vacuum or negative pressure inside the compartment 48 is decreased (i.e., air pressure increases). Reducing the magnitude of the vacuum or negative pressure inside the compartment 48 may be beneficial to reduce the forces exerted or experienced inside the compartment 48, which are experienced by the belt 44 and the rollers 52, 56, 60. In general, regardless of whether a particular embodiment or example utilizes the venting assembly 40, it may be beneficial to accurately and/or precisely control the vacuum or negative pressure so as to avoid damaging the belt 44 or stalling the rollers 52, 56, 60. It is contemplated that alternative approaches to reducing the forces inside the compartment 48 may be utilized without departing from the concepts disclosed herein. For example, the tension on the belt 44 may be increased rather than venting some of the vacuum or negative pressure.

Figure 3:
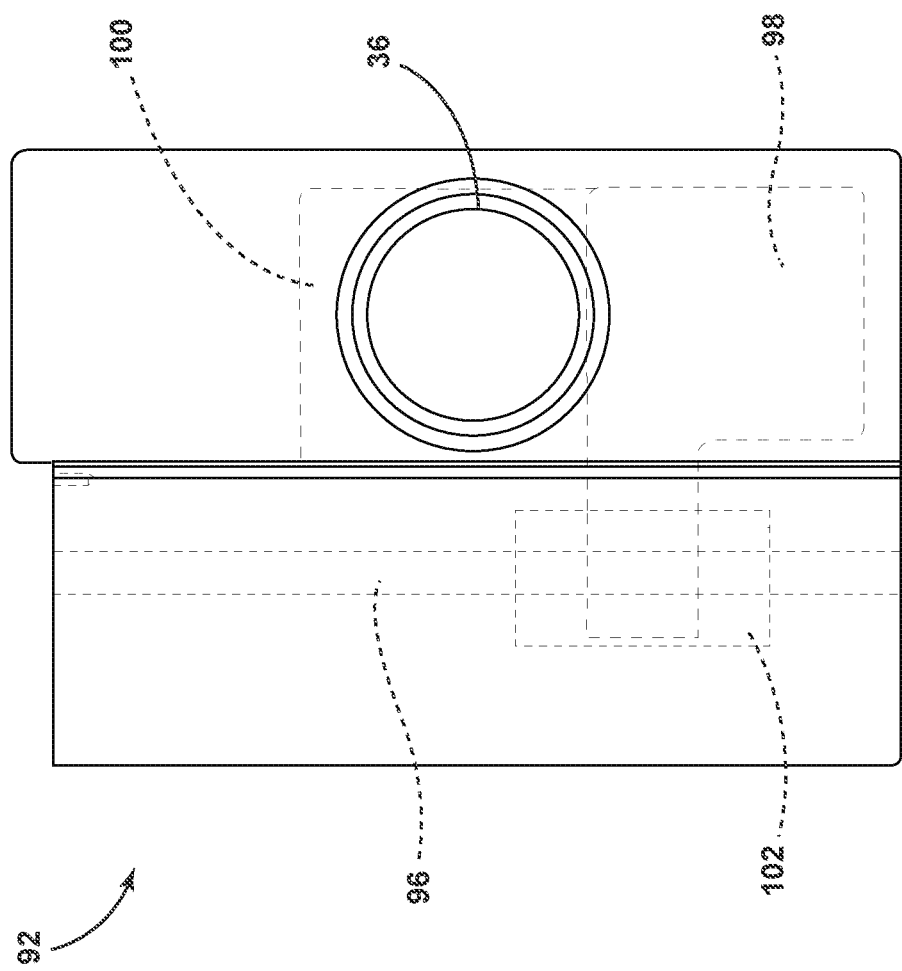
FIG. 3 is a front view of a cutting mechanism, illustrating internal components in phantom lines, according to one embodiment.

Referring to FIGS. 1, 2, and 4, a cutting mechanism 92 may be positioned between the entrance nozzle 36 and the compartment 48 for the purpose of cutting the optical fiber 24 to disengage the fiber 24 from the apparatus 20 and/or the roller assembly 28. The cutting mechanism 92 is configured to rapidly cut the fiber 24 while the fiber 24 is traveling at speed. The term at speed, as used herein, is intended to refer to the speed or velocity at which the fiber 24 is traveling as the fiber 24 is wound onto the spool and/or being directed to the disposal can. That is, the velocity of the fiber 24 is not decreased prior to activation of the cutting mechanism 92. Operating the cutting mechanism 92 while the fiber 24 is traveling at speed is beneficial because in most embodiments and examples, the drawing process of the fiber 24 at the draw tower is not halted once the drawing process has begun. FIG. 3 shows the cutting mechanism 92 with an air cylinder 96 that moves a cutting blade 98. Actuation of the air cylinder 96 translates the cutting blade 98 such that the fiber 24 is pushed into a channel 100. The cutting blade 98 is coupled to the air cylinder 96 by a floating joint 102 that is configured to be movable by the air cylinder 96 in a vertical direction. The cutting blade 98 and the channel 100 cooperate to cut or generally break the fiber 24 at a desired location on the fiber 24. Additionally or alternatively, the cutting mechanism 92 may be positioned at the exit of the compartment 48 between the compartment 48 and the venting assembly 40. While the cutting blade 98 is described as being actuated by the air cylinder 96, the present disclosure is not so limited. It is contemplated that alternative methods of actuating the cutting blade 98 may be employed without departing from the concepts disclosed herein.

In another configuration, the first, second, and/or third rollers 52, 56, 60 may remain in the engaged configuration from acquisition of the fiber 24 into the entrance nozzle 36, during accumulation of the optical fiber 24 downstream of the apparatus 20, as well as during tensioning of the fiber 24. The term "tensioning" as used herein refers to maintaining tension on the optical fiber 24 upstream of the roller assembly 28 and downstream of the draw tower assembly. Said another way, the term "tensioning" as used herein refers to a post-forming tensioning of the fiber 24 between, for example, a tractor of the draw tower assembly and the roller assembly 28. In this configuration, the complexity of the apparatus 20 is reduced by eliminating the step of actuating the third roller 60 between the engaged and disengaged configurations. However, disadvantages of running with the apparatus 20 so configured are introduced by having the roller assembly 28 in a constantly-engaged configuration. These disadvantages include, but are not limited to, an inability to preferentially tension only fiber 24 that is free from defects (e.g., coating defects) that may damage the belt 44 or the rollers 52, 56, 60 and introducing complex geometries that may be necessary to position the rollers 52, 56, 60 properly at the entrance nozzle 36 as well as at the exit.

Performance of the apparatus 20 as outlined with Configuration 1 is capable of being tested in both a laboratory setting and on a draw tower. For example, a high-speed video can be employed to evaluate the behavior of the fiber 24. Configuration 1 of the apparatus 20 is capable of acquiring the fiber 24, tensioning the fiber 24, positioning the fiber 24, and performing fiber 24 hand-off at speeds in excess of current production speeds, where systems that employ an aspirator begin to fail. Fiber 24 hand-off, as used herein, refers to the transfer of the fiber 24 from the apparatus 20 to a spool. During acquisition of the fiber 24, the apparatus 20 operates with a vacuum or negative pressure, which may be measured at the collection can. Exemplary parameters, according to various embodiments, are outlined in Table 1, below. The ranges disclosed in Table 1 are exemplary in nature and are not intended to limit the present disclosure in any way. It is contemplated that values of the exemplary parameters may be utilized outside of the provided ranges without departing from the concepts disclosed herein.

TABLE 1

Exemplary Parameters

| Parameter | Value |
| --- | --- |
| Fiber Velocity (m/s) | 20-120 |
| Belt Tension (N) | 1-20 |
| Belt Width (mm) | 10-40 |
| Belt Wrap Angle (degrees) | 1-180 |
| Pressure at Collection Can (mmHg) | −100 to −300 |

Roller Configuration 2: Coated Rollers

With reference to FIG. 7, Configuration 2 of the apparatus 20 includes at least two rollers 32 where at least one of the rollers 32 is treated with a coating 104 or has a surface treatment (e.g., diamond impregnated nickel, bead blasting, or other processes that roughen the surface of the rollers 32). In the depicted example, three rollers 32 are employed. In various examples, the coating can be neoprene, urethane, or a similar material that increases the coefficient of friction between the optical fiber 24 and a surface of the roller 32 that is coated. FIG. 7 shows one possible arrangement of the rollers 32. The arrangement of the rollers 32 may be configured such that there is a wrap angle θ around at least one of the rollers 32 that is at least about sixty degrees (60°), at least about ninety degrees (90°), at least about one-hundred-twenty degrees (120°), at least about one-hundred-fifty degrees (150°), at least about one-hundred-eighty degrees (180°), and/or combinations or ranges thereof. The roller 32 that is provided with the aforementioned wrap angle θ may be positioned upstream of a pair of the rollers that pinch or sandwich the fiber 24 therebetween. The rollers 32 that are configured to pinch or sandwich the fiber 24 may be referred to as pinch rollers 108. Of the two pinch rollers 108, one roller may be coated with neoprene or a similar material that increases the coefficient of friction during the pinching of the fiber 24 such that the optical fiber 24 does not slip through the two pinch rollers 108. The coating 104 or surface treatment is applied to the exterior surface or contact surface that interacts with the fiber 24. The pinch roller 108 that is coated may be referred to as a first coated roller 112. The rollers 32 that are coated in this configuration may be directly coupled to motors such that these rollers 32 are motor-driven. Unlike Configuration 1, the roller assembly 28 in Configuration 2 does not provide isolation of tensioned fiber 24 at the entrance on the left side of FIG. 7 from fiber 24 at the exit on the right side of FIG. 7. Instead, the arrangement in Configuration 2 utilizes some amount of tension at the exit of the roller assembly 28 to maintain tension at the entrance of the roller assembly 28.

The arrangement of the coated rollers may be determined by the desired tension of the fiber 24 and the process utilized for threading the fiber 24 onto the rollers 32. An increase in the wrap angle θ around a second coated roller 116 yields an increase in the tension of the fiber 24. Additional coated rollers may also yield an increase in the tension of the fiber 24. With respect to the threading of the fiber 24 onto the rollers 32, the process may be similar to the examples discussed above with reference to the belted rollers in Configuration 1. The first and second coated rollers 112, 116 may be enclosed in the compartment 48. The pinch rollers 108 may be configured to be actuated between a fiber-pinching position and a fiber-release position such that the fiber 24 initially passes through the compartment 48 without contacting one or more of the pinch rollers 108. When tensioned fiber 24 is desirable for a given process, the pinch rollers 108 may be actuated to directly engage with the fiber 24 and then the pinch rollers 108 may rotate to provide the desired wrap angle θ around one of the upstream rollers (e.g., the second coated roller 116). For example, the pinch rollers 108 may rotate about an axis defined by a point of contact between the pinch rollers 108 to provide the desired wrap angle θ around one of the upstream rollers. FIG. 7 illustrates the fiber-pinching position.

The pinch roller or coated roller configuration (i.e., Configuration 2), while capable of tensioning the optical fiber 24, may present several disadvantages when compared to the belted rollers of Configuration 1. The first disadvantage is that the material that is used to coat the first and second coated rollers 112, 116 may be susceptible to wear and tear during contact with the optical fiber 24. While the belt 44 in the belted system is also susceptible to wear, the belt 44 is easily removed from the rollers 52, 56 and exchanged, whereas the first and second coated rollers 112, 116 require removing an entire motor assembly on which the first and second coated rollers 112, 116 are mounted. The second disadvantage is that the coated roller system requires some amount of tension maintained on the outlet side of the roller assembly 28 to develop and/or maintain traction in the apparatus 20. This is due to the coated roller system relying heavily on the capstan equation, where tension is a function of the wrap angle θ and the coefficient of friction around the associated roller (e.g., the first and/or second coated roller 112, 116). In Configuration 2, the pinch rollers 108 provide the holding force that keeps the optical fiber 24 from slipping or generally becoming disengaged from the roller assembly 28.

The various embodiments, examples, and configurations of the apparatus for tensioning and threading an optical fiber 20 of the present disclosure offer technical and competitive advantages through improved performance and cost savings. For example, the apparatus for tensioning and threading an optical fiber 20 is capable of tensioning optical fiber 24 that is moving at velocities greater than the velocities currently utilized in the production process, which enables faster draw and winding speeds. While predecessors to the apparatus 20 of the present disclosure, such as the aspirator, are limited by drag and friction, the apparatus for tensioning and threading an optical fiber 20 disclosed herein is not limited by drag and friction. However, the capabilities of the motors utilized in the present disclosure are taken into consideration and may play a role in achieving optimum results in the configurations disclosed herein. That being said, motor technology is capable of providing sufficient speed and torque to operate the apparatus for tensioning and threading an optical fiber 20.

Additionally, the apparatus for tensioning and threading an optical fiber 20 delivers a constant, configurable tension to the fiber 24 by pinning the fiber 24 inside the roller assembly 28. The roller assembly 28 is capable of providing a constant torque, with or without the belt 44. The application of the constant torque yields an improved success rate for threading the fiber 24 at the draw speeds currently employed, as well as draw speed that are greater than those currently employed. When the tension fluctuates or deviates during the automatic threading process disclosed herein, the fiber 24 can come into contact with fixed surfaces, which can create flaws in the fiber 24, break the fiber 24, and result in optical fiber 24 that cannot be sold to a consumer. The apparatus 20 of the present disclosure provides consistent tension to the optical fiber 24 such that tension fluctuations are substantially decreased when compared to alternative approaches.

Further, the apparatus for tensioning and threading an optical fiber 20 delivers the fiber 24 at a stable position, which improves the success rate of threading the fiber 24 by reducing the interaction between the tensioned length of the optical fiber 24 and stationary and/or moving objects on the optical fiber winder.

Still further, the apparatus for tensioning and threading an optical fiber 20 provides isolation between the tensioned length of the optical fiber 24 and the region of the optical fiber 24 that is being disposed of or spooled during the threading process. Unlike processes that rely on compressed or high-pressure air to tension the optical fiber 24, the apparatus 20 of the present disclosure is capable of providing tension regardless of whether the length of fiber 24 exiting the apparatus 20 and travelling to the collection can and/or spool is stable.

Further yet, the apparatus for tensioning and threading an optical fiber 20 reduces the cost of operating the apparatus 20 by eliminating at least high-pressure air as a process input.

The described embodiments are preferred and/or illustrated, but are not limiting. Various modifications are considered within the purview and scope of the appended claims.

What is claimed is:

1. An apparatus for tensioning and threading an optical fiber, comprising:
   a plurality of rollers structured to maintain an optical fiber under tension; and
   a compartment that houses the plurality of rollers, the compartment being held under a negative pressure.

2. The apparatus for tensioning and threading an optical fiber of claim 1, further comprising:
   a belt situated adjacent to, and in contact with, at least one of the plurality of rollers.

3. The apparatus for tensioning and threading an optical fiber of claim 1, further comprising:
   a belt situated adjacent to, and in contact with, the plurality of rollers.

4. The apparatus for tensioning and threading an optical fiber of claim 1, further comprising:

a belt situated adjacent to the plurality of rollers, wherein the belt and the plurality of rollers are positioned such that at least one of the rollers is free of engagement with the optical fiber.

5. The apparatus for tensioning and threading an optical fiber of claim 1, further comprising:
a belt situated adjacent to the plurality of rollers, wherein, the belt and the plurality of rollers are positioned such that at least one of the rollers contacts the optical fiber.

6. The apparatus for tensioning and threading an optical fiber of claim 1, wherein the plurality of rollers, the belt, and the negative pressure within the compartment that houses the plurality of rollers, provide about 0.50 N to about 15 N of tension to the optical fiber within the compartment.

7. The apparatus for tensioning and threading an optical fiber of claim 1, wherein at least one of the rollers is driven by a motor.

8. The apparatus for tensioning and threading an optical fiber of claim 7, wherein the motor is configured to provide a torque that is adjustable.

9. An apparatus for tensioning and threading an optical fiber, comprising:
a first roller;
a second roller;
a third roller;
a belt that wraps around the first and second rollers, wherein the belt is in direct physical contact with the first and second rollers, and wherein at least one of the first, second, and third rollers is actuatable such that the optical fiber is captured between the belt and the third roller such that tension is provided to the optical fiber downstream of a draw tractor, and wherein the first roller, the second roller, the third roller, and the belt are sized and positioned such that the optical fiber is moved through the apparatus for tensioning and threading an optical fiber at a speed of at least about 30 m/s.

10. The apparatus for tensioning and threading an optical fiber of claim 9, wherein the third roller is movable between an engaged configuration and a disengaged configuration relative to the belt.

11. The apparatus for tensioning and threading an optical fiber of claim 10, wherein the actuation of the third roller from the disengaged configuration to the engaged configuration captures an optical fiber between the third roller and the belt.

12. The apparatus for tensioning and threading an optical fiber of claim 9, wherein at least one of the first, second, and third rollers is driven such that a torque is provided to the associated roller.

13. The apparatus for tensioning and threading an optical fiber of claim 9, further comprising:
a compartment that houses the first, second, and third rollers as well as the belt, wherein the compartment is held under a negative pressure.

14. The apparatus for tensioning and threading an optical fiber of claim 13, further comprising:
an entrance nozzle positioned upstream of the compartment and directly coupled to the compartment, wherein the entrance nozzle includes a guide structure.

15. The apparatus for tensioning and threading an optical fiber of claim 14, wherein the guide structure further comprises:
a base;
an upper portion; and
a guide channel, wherein the guide channel has a width that is greater than an outer diameter of an optical fiber that is coupled thereto.

16. A method of operating an apparatus for tensioning and threading an optical fiber, comprising the steps of:
acquiring the optical fiber through an entrance nozzle;
capturing the optical fiber between a plurality of rollers; and
tensioning the optical fiber by rotating at least one of the plurality of rollers.

17. The method of operating an apparatus for tensioning and threading an optical fiber of claim 16, wherein the step of capturing the optical fiber between a plurality of rollers further comprises the step of:
actuating at least one of the rollers from a disengaged configuration to an engaged configuration.

18. The method of operating an apparatus for tensioning and threading an optical fiber of claim 16, further comprising the step of:
providing a negative pressure to a compartment of the apparatus for tensioning and threading an optical fiber.

19. The method of operating an apparatus for tensioning and threading an optical fiber of claim 16, further comprising the step of:
actuating a cutting mechanism.

* * * * *

UNITED STATES PATENT AND TRADEMARK OFFICE
CERTIFICATE OF CORRECTION

PATENT NO. : 10,968,070 B2  
APPLICATION NO. : 16/211808  
DATED : April 6, 2021  
INVENTOR(S) : Kirk Patton Bumgarner et al.

Page 1 of 1

It is certified that error appears in the above-identified patent and that said Letters Patent is hereby corrected as shown below:

On the Title Page

In Column 1, item (60), Related U.S. Application Data, below "Mar. 7, 2018." insert -- (30) Foreign Application Priority Data Apr. 25, 2018 (NL) ...... 2020822 --.

Signed and Sealed this  
Fifth Day of September, 2023

Katherine Kelly Vidal  
*Director of the United States Patent and Trademark Office*